United States Patent [19]
Collins et al.

[11] Patent Number: 5,412,042
[45] Date of Patent: May 2, 1995

[54] CROSSLINKED ELASTOMERIC ACETAL POLYMERS

[75] Inventors: George L. Collins, Maplewood; William M. Pleban, Stanhope; Milton J. Hayes, Jr., Irvington, all of N.J.

[73] Assignee: Hoechst Celanese Corp., Somerville, N.J.

[21] Appl. No.: 735,974

[22] Filed: Jul. 25, 1991

[51] Int. Cl.⁶ .............................................. C08L 59/02
[52] U.S. Cl. .................... 525/403; 525/398; 528/403
[58] Field of Search ................. 525/403, 398; 528/403

[56] References Cited

U.S. PATENT DOCUMENTS

| | | | |
|---|---|---|---|
| 3,393,157 | 7/1968 | Janssen et al. | 528/403 |
| 3,422,035 | 2/1969 | May et al. | 528/403 |
| 4,898,925 | 2/1990 | Collins et al. | 525/407 |
| 5,041,505 | 8/1991 | Collins et al. | 525/398 |

*Primary Examiner*—James J. Seidleck
*Assistant Examiner*—W. Robinson H. Clark
*Attorney, Agent, or Firm*—James L. McGinnis

[57] ABSTRACT

A crosslinked elastomeric acetal polymer is synthesized from 1,3-dioxolane, 1,3-dioxepane, and a polyfunctional crosslinking compound having two or more functional groups that react under conditions of cationic polymerization, such as 1,4-divinyloxybutane or poly(butadiene oxide). The polymers are elastomeric and non-crystalline at temperatures well below room temperature. They can be blended with crystalline acetal polymers to produce blends that have improved impact properties.

6 Claims, No Drawings

CROSSLINKED ELASTOMERIC ACETAL POLYMERS

FIELD OF THE INVENTION

This invention relates to crosslinked acetal polymer compositions. The invention relates further to blends of the crosslinked elastomeric acetal polymers with crystalline acetal polymers.

BACKGROUND OF THE INVENTION

Molding compositions based on acetal polymers having a high degree of crystallinity have been in use for many years. They have been used in many applications as, for example, automobile bumper extensions and instrument panels; plumbing supplies, such as valves, shower assemblies, flush tank components, faucets and pipe fittings; tool components; and household and personal products.

These crystalline acetal polymers have excellent physical properties. For many applications, however, improved impact resistance would be highly desirable. Typically, the impact strength of a crystalline polymer is improved by blending it with an elastomer to form shock-absorbing rubbery domains in the crystalline polymer. This approach to impact resistance is most successful when there is a strong interaction between the surface of the rubbery domains and the crystalline polymer. Elastomeric polymers which have strong interactions with a crystalline polymer also are useful for bonding two surfaces of the crystalline polymer and for bonding the crystalline polymer to other materials.

A very limited number of acetal copolymers have been synthesized which are non-crystalline and which are similar enough in chemical structure to the crystalline acetals to interact well with them. One example, commonly assigned U.S. Pat. No. 4,788,258, discloses non-crystalline copolymers derived from trioxane and 1,3-dioxolane with the 1,3-dioxolane content being between about 65 and 75 mol percent of the total monomer composition. These polymers have a glass transition temperature that is less than about $-60°C$.

Commonly assigned U.S. Pat. No. 4,758,608 teaches noncrystalline acetal terpolymers synthesized from trioxane, 1,3-dioxolane, and formals of monoethylenically unsaturated aliphatic diols. These can be cured with multifunctional crosslinking monomer to produce insoluble, rubbery, non-tacky elastomeric acetal polymers. Commonly assigned U.S. Pat. No. 4,898,925 discloses copolymers having improved elastomeric properties that are made from trioxane, 1,3-dioxolane, and about 0.005 to 0.15% of a bifunctional monomer such as 1,4-butanediol diglycidyl ether or butadiene diepoxide. All of the above non-crystalline acetal polymers form blends with crystalline acetals that show improved impact resistance over unblended crystalline acetals.

Copending, commonly assigned and commonly invented U.S. application Ser No. 406,641 teaches acetal copolymers made from 1,3-dioxolane and 1,3-dioxepane that are elastomeric and that are non-crystalline at temperatures as low as $-120°$ C. and below. These also form blends with crystalline acetal polymers that have improved impact resistance.

Copending U.S. application Ser. No. 636,811, also commonly assigned and commonly invented, discloses acetal terpolymers of 1,3-dioxolane, 1,3-dioxepane, and 4,7-dihy-dro-1,3-dioxepin. These terpolymers are also elastomeric and non-crystalline. After crosslinking or vulcanization, these polymers become non-thermoplastic elastomers.

Most of the compositions described above are thermoplastic materials which readily deform under stress. Crosslinked compositions which have high elasticity and good dimensional stability, that are non-crystalline at temperatures well below room temperature and that are not thermoplastic, would be extremely useful for making high impact acetal blends. The composition taught herein features these properties and is therefore extremely useful for making impact-modified acetal blends.

SUMMARY OF THE INVENTION

The composition of this invention is a crosslinked elastomeric acetal polymer which is composed of monomer units that are derived from 1,3-dioxolane, 1,3-dioxepane, and one or more polyfunctional crosslinking compounds. The polyfunctional crosslinking compounds have two or more functional groups that react under conditions of cationic polymerization. The polyfunctional crosslinking compounds can be monomers or polymers. Examples of reactive functional groups that may be used include epoxides, glycidyl ethers, glycidyl esters, cyclic ethers, vinyl ethers, vinyl esters, acrylate esters, methacrylate esters, allyl ethers, and allyl esters. A particularly effective polyfunctional crosslinking compound having two reactive groups is 1,4-divinyloxybutane. Poly(butadiene oxide) is a very effective polymeric polyfunctional crosslinking compound.

The 1,3-dioxolane and 1,3-dioxepane monomer units are incorporated in the polymer in a ratio of about 20:80 to about 80:20, more preferably in a ratio of about 40:60 to about 60:40, and most preferably in about equal amounts, based on the volumes of the monomers prior to polymerization. The polyfunctional crosslinking compound can be included in an amount that is about 0.1% to about 10% of the sum of the volumes of 1,3-dioxolane and 1,3-dioxepane. Polyfunctional crosslinking compounds having two reactive groups, such as 1,4-divinyloxybutane, are preferably used in an amount by volume of about 0.5% of the sum of the 1,3-dioxolane and 1,3-dioxepane. Polymeric polyfunctional crosslinking compounds as, for example, poly(butadiene oxide), are preferably used in amounts by volume of about 5% to about 10% of the sum of the volumes of 1,3-dioxolane and 1,3-dioxepane.

The polymers of this invention are made by ring opening polymerization of the cyclic ether monomers, generally using a cationic polymerization catalyst, such as a Bronsted or Lewis acid. The polymers are rubbery, showing no evidence of crystallinity.

The polymers are particularly useful for blending with crystalline acetal polymers to make impact modified blends. These blends can be further blended with numerous additives, including plasticizers, formaldehyde scavengers, nucleating agents, mold lubricants, antioxidants, fillers, colorants, pigments, reinforcing agents, light stabilizers, and other stabilizers. The blended polymers, with or without the additives listed above, are useful as molding resins.

DETAILED DESCRIPTION

The crosslinked elastomeric acetal polymers of the current invention are made by copolymerization of 1,3-dioxolane, 1,3-dioxepane, and one or more polyfunctional crosslinking compounds; the functionalities are reactive under cationic polymerization condition. The polymers are elastomeric, having glass transition temperatures that are well below room temperature, and are non-crystalline at temperatures as low as −120° C.

Acetal polymers are defined as polymers which comprise oxymethylene units in the polymer backbone. Oxymethylene units have the following structural formula:

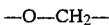

Because 1,3-dioxolane and 1,3-dioxepane are both cyclic acetals, the stoichiometry of the polymerization reaction results in a polymer wherein oxymethylene units comprise about 50% of the monomer units in the polymer, exclusive of the crosslinks resulting from the presence of the polyfunctionl crosslinking compounds. Crystalline acetal polymers have higher concentrations of oxymethylene units, generally comprising greater than about 85% of the monomer units.

The remaining monomer units, other than oxymethylene and crosslinking units, are oxyethylene ($-OCH_2CH_2-$) and oxybutylene ($-OCH_2CH_2CH_2CH_2-$). Although the composition of the present invention is described in terms of the monomers that were used to synthesize the polymers (1,3-dioxolane, 1,3-dioxepane, and the crosslinking monomers), one skilled in the art can readily identify other monomers that will give substantially the same composition of oxymethylene, oxyethylene, oxybutylene, and crosslinking monomer units. Examples include other cyclic ethers such as 1,3,5-trioxane, ethylene oxide and tetrahydrofuran. These compositions are well within the scope of the present invention.

The three monomers can be copolymerized over a broad range of ratios. The 1,3-dioxolane and 1,3-dioxepane can be combined in a volume:volume ratio ranging from about 80:20 to about 20:80, more preferably in a ratio ranging from about 60:40 to about 40:60, and most preferably in a ratio of about 50:50. The polyfunctional crosslinking compound can be included in an amount by volume that is about 0.1% to about 10% of the sum of the volumes of 1,3-dioxolane and 1,3-dioxepane. When the polyfunctional crosslinking compound is bifunctional as, for example, 1,4-divinyloxybutane, it is preferably included in an amount that is by volume about 0.1% to about 0.5% of the sum of the volumes of 1,3-dioxolane and 1,3-dioxepane when the polyfunctional crosslinking compound is polymeric as, for example, poly(butadiene oxide), it is preferably included in an amount that is by volume about 5% to about 10% of the sum of the volumes of 1,3-dioxolane and 1,3-dioxepane.

The polyfunctional crosslinking compounds have two or more reactive functional groups that can be incorporated into the growing polymer chains during the polymerization so that they act as crosslinking agents. The reactive functional groups can be the same or different, and they can be any functionality that is reactive under cationic polymerization conditions. Examples of suitable reactive functional groups include epoxides, glycidyl ethers, glycidyl esters, cyclic ethers, vinyl ethers, acrylate esters, methacrylate esters, vinyl esters, allyl ethers, and allyl esters. The polyfunctional compound may be either monomeric or polymeric. The main structural requirement for the polyfunctional compound is that the structure of the compound, exclusive of the reactive functional groups, should not be affected by the cationic polymerization conditions. Suitable kinds of structures include aliphatic hydrocarbon chains, alicyclic and aromatic structures, and combinations of these, optionally substituted with non-reactive substitutents such as halogen atoms and alkyl groups. The polyfunctional compounds can also contain non-hydrocarbon linkages as, for example, ester, ether, or amide linkages, as long as they do not react under the polymerization conditions. The polyfunctional compound also should not be insoluble during the polymerization reaction.

Examples of suitable bifunctional compounds include 1,6-hexanediol diacrylate or dimethacrylate, 1,6-hexanediol diglycidyl ether, the divinyl ester of sebacic acid, 1,4-butanediol diglycidyl ether, 1,4-butanediol diacrylate or dimethacrylate, butadiene diepoxide, 2,3-epoxypropyl acrylate, diethylene glycol diacrylate and dimethacrylate, triethylene glycol diglycidyl ether, 1,10-decanediol diglycidyl ether, 1,6-divinyloxyhexane, 1,2-divinyloxyethane, divinyl ether, divinyl formal, 1,4-divinyloxybutane, the divinyl ether of triethylene glycol, and the like. Mixtures of bifunctional crosslinking compounds may also be used. These bifunctional crosslinking compounds are known in the art and are readily synthesized by methods well known in the art. Many of the monomers listed above are available commercially from suppliers of fine chemicals. A particularly useful bifunctional crosslinking compound is 1,4-divinyloxybutane, which is commercially available from Polysciences, Inc.

Examples of polyfunctional crosslinking compounds with more than two reactive functional groups include trifunctional compounds, such as trimethylolpropane triacrylate and trimethacrylate and the trivinyl ether and triglycidyl ether of trimethylolpropane. Examples of tetrafunctional crosslinking compounds include pentaerythritol tetraacrylate and tetramethacrylate and the tetravinyl ethers and tetraglycidyl ethers of pentaerythritol. Finally, the polyfunctional crosslinking compounds can be polymeric as, for example, poly(butadiene oxide), which is a polyepoxide. Poly(butadiene oxide) is a preferred polyfunctional crosslinking compound. These polyfunctional crosslinking compounds with more than two functional groups are also generally well known in the art. Many of these are commercially available as, for example, those derived from trimethylolpropane and pentaerythritol, as well as poly(butadiene oxide), which is available from Polysciences, Inc.

The polymerization may be carried out in a solvent, such as a hydrocarbon (e.g., hexane or cyclohexane) or a chlorinated hydrocarbon (e.g., dichloromethane or 1,2-dichloroethane). Any solvent is suitable provided that it does not react with the catalyst or participate in the reaction. More preferably, however, the polymerization is carried out neat, i.e., without a solvent, to avoid problems associated with solvent residues, toxicities, volatility, and waste by-products that commonly occur when solvents are used.

The polymerization is carried out under a dry, inert atmosphere, such as nitrogen or argon. The atmosphere, the reactants, and the solvent, if used, should be substantially anhydrous. Preferably, less than 10 ppm of water is present, since the presence of water leads to chain transfer, resulting in reduced molecular weight. The monomers can generally be dried by methods well known in the art, such as distillation from sodium/potassium alloy, followed by subsequent manipulations using techniques that minimize exposure to air.

The polymerization reactions are initiated by cationic polymerization catalysts. These include strong Bronsted acids, such as trifluoromethanesulfonic acid (triflic acid) and p-toluenesulfonic acid. Lewis acids can also be used, such as p-nitrobenzenediazonium tetrafluoroborate, boron trifluoride, and phosphorous pentafluoride. Catalyst concentrations should be low, ranging from about $10^{-2}$M to about $10^{-5}$M, in order to achieve high molecular weight. The preferred catalyst is triflic acid at a preferred concentration of about $10^{-2}$M to about $10^{-4}$M, preferably about $10^{-3}$. It is convenient to dilute the catalyst (e.g., triflic acid) in a dry, inert solvent, such as nitromethane or methylene chloride, and then measure out the diluted catalyst, in order to facilitate accurate measurement of the small quantity of catalyst that is actually needed to effect polymerization.

The polymerization reactions are preferably carried out at room temperature and atmospheric pressure. Under these conditions, the reaction proceeds readily when triflic acid is the catalyst at a concentration of about 0.001M, and 1,4-divinyloxybutane is the bifunctional crosslinking compound, the reaction is complete in a period from about 30 seconds to about 1 hour when triflic acid is the catalyst at a concentration of about 0.001M, and poly(butadiene oxide) is the polyfunctional crosslinking compound, the reaction is generally complete within 1 day but can take up to about 3 days.

The polymers that are obtained are very rubbery and show no evidence of being crystalline. Polymers derived from 1,3-dioxolane and 1,3-dioxepane but without the crosslinking compound, described in U.S. application Ser. No. 406,641, are non-crystalline at temperatures as low as $-120°$ C. The polymer made from equimolar amounts of 1,3-dioxolane and 1,3-dioxepane has a glass transition temperature of about $-79°$ C. as measured by differential scanning calorimetry. The crosslinked polymer described above should exhibit similar thermal behavior.

The crosslinked elastomeric acetal polymers are particularly useful for blending with crystalline acetal polymers. The elastomeric acetal polymers contain about 50% oxymethylene (—O—CH$_2$—) repeat units on a molar basis, exclusive of the crosslinking units, whereas crystalline acetal polymers generally contain greater than about 85% oxymethylene repeat units on a molar basis. Because of their structural similarity, these polymers interact strongly with each other. They are therefore expected to form stable blends. These blends are expected to have excellent impact resistance because of the presence of the elastomeric regions intimately mixed into the crystalline polymer.

The crystalline acetal polymers with which the crosslinked elastomeric acetal polymers can be blended are commercially available from a number of manufacturers as homopolymers, copolymers, terpolymers, and the like. These crystalline acetal polymers are well known in the art and have been reviewed extensively. For example, a review of acetals can be found in an article by T. J. Dolce and J. A. Grates entitled, "Acetal Resins," pp. 42–61 in *Encyclopedia of Polymer Science and Engineering*, Vol. 1, John Wiley and Sons, New York, 1985. Additional information on acetal copolymers and terpolymers can also be found in commonly assigned U.S. Pat. No. 4,758,608, the disclosure of which is incorporated herein by reference.

Typically, acetal homopolymers, or poly(oxymethylenes), are prepared by polymerizing anhydrous formaldehyde or trioxane. Oxymethylene homopolymers are usually stabilized against thermal degradation by end-capping with, for example, ester or ether groups, such as those derived from alkanoic anhydrides (for example, acetic anhydride) or dialkyl ethers (for example, dimethyl ether) or by incorporating stabilizer compounds into the homopolymer. Commercially available acetal homopolymer is made by polymerizing anhydrous formaldehyde in the presence of an initiator, after which the polymer is endcapped by acetylation of the hemiacetal end groups with acetic anhydride in the presence of sodium acetate catalyst. Methods for making and end-capping acetal homopolymers are taught in U.S. Pat. Nos. 2,768,994 and 2,998,409. Acetal homopolymer is commercially available under the trademarks Delrin ® and Tenac ®.

Acetals which are especially suitable for use in the blends of the present invention are crystalline oxymethylene copolymers having repeat units which consist essentially of oxymethylene groups interspersed with oxy(higher alkylene) groups represented by the general formula:

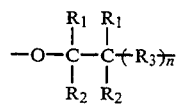

wherein $R_1$ and $R_2$ are hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains no more than two carbon atoms. Oxymethylene groups generally will constitute from about 85 to about 99.9 percent of the recurring units in such copolymers and are generally incorporated by ring-opening polymerization of trioxane in the presence of an acidic catalyst. The oxy(higher alkylene) groups are incorporated into the copolymer during ring-opening polymerization of trioxane by copolymerizing a cyclic ether or cyclic formal having at least two adjacent carbon atoms. The preferred oxy(higher alkylene) group is oxyethylene, having the formula:

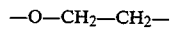

Oxyethylene is incorporated into the polymer by copolymerization of ethylene oxide or 1,3-dioxolane with trioxane.

Acetal copolymers as described above, which have a structure consisting essentially of oxymethylene and oxyethylene groups, are thermoplastic materials having a melting point of at least 150° C. They normally are millable or processable at temperatures ranging from about 175° C. to about 200° C. and have a number average molecular weight of at least 10,000. They are normally highly crystalline, having a polymer crystallinity from about 60% to about 80% or greater.

A particularly preferred class of oxymethylene copolymers is commercially available under the name Celcon ® acetal copolymer. Celcon ® is a registered trademark of Hoechst Celanese Corporation. Celcon ® acetal is a copolymer made from about 98 weight % of trioxane and about 2 weight % ethylene oxide. Blends of the current invention may be made using any commercial grade of Celcon ® acetal polymer. Acetal copolymers are also available from other manufacturers under several trademarks, including Hostaforme ®, Duracon ®, Ultraform ® and Iupital ®.

Oxymethylene terpolymers may also be used in making blends of the present invention. These comprise oxymethylene groups, oxy(higher alkylene) groups as described above, and a different third group derived from a bifunctional monomer interpolymerized with oxymethylene and oxy(higher alkylene) groups. The bifunctional monomer generally has the formula:

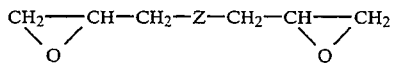

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive, or an oxypoly-(lower alkoxy) group, preferably one having from 2 to 4 recurring lower alkoxy groups each with 1 or 2 carbon atoms. Examples include the diglycidyl ethers of ethylene glycol, 1,3-butanediol, and 1,4-butanediol, with the diglycidyl ether of 1,4-butanediol being preferred. A terpolymer as described above comprising about 98% by weight trioxane, about 2% by weight ethylene oxide, and about 0.05% by weight butanediol diglycidyl ether as the bifunctional monomer is commercially available from Hoechst Celanese Corporation under the name Celcon ® U10 acetal polymer. More detailed descriptions of the methods for making oxymethylene-based copolymers and terpolymers and their compositions can be found in previously incorporated U.S. Pat. No. 4,758,608.

The crystalline acetal polymers may also contain additives, such as plasticizers, formaldehyde scavengers, nucleating agents, mold lubricants, antioxidants, fillers (e.g., glass fibers, beads, etc.), colorants, pigments, reinforcing agents, light stabilizers, other stabilizers, and the like. These all may be included in the blend so long as they do not detrimentally affect the blend, as, for example, by causing chemical decomposition of the acetal polymer.

Blends of the crosslinked elastomeric acetal polymers and crystalline acetal polymers can be made by any of the conventional methods that will result in a uniform blend. These methods are well known in the art. Typically, the crosslinked elastomeric acetal polymer, in the form of a dry or slightly tacky solid, is dry mixed with the crystalline acetal polymer, which may be in the form of pellets, chips, flakes, granules or powder, usually at room temperature. The resulting mixture is melt blended in any conventional type extrusion equipment, which is customarily heated to a temperature from about 170° C. to about 220° C., and preferably from about 190° C. to about 210° C., for a time sufficient to give a uniform mixture. The sequence of addition is not critical various other additives, such as plasticizers, formaldehyde scavengers, nucleating agents, mold lubricants, antioxidants, fillers (e.g., glass fibers, beads, etc.), colorants, pigments, reinforcing agents, light stabilizers, other stabilizers and the like may also be added prior to melt blending, or these additives may have already been blended with one or both of the polymers to be blended. It may be necessary to grind the elastomeric acetal to a particle size suitable for impact modified blends. Grinding can be performed by any of the methods commonly used in the art for grinding elastomers, such as for example, cryogenic grinding.

Preferably, the crosslinked elastomeric acetal polymer and the crystalline acetal polymer are dried (either individually or together) before being subjected to the blending procedure. Drying can be done in desiccated air having a few point of about −30° C. to −40° C. or lower, at a temperature of from about 70° C. to about 110° C. The drying time will depend primarily on the moisture content, drying temperature, and particular equipment employed, but typically is from about 2 to about 6 hours or more. If drying is conducted for longer periods of time, such as overnight, the drying temperature should preferably be about 70° C. to about 85° C. In general, any conventional drying procedure can be used-to reduce the moisture content to below about 0.1 weight percent, based on the total weight of the unsaturated elastomeric acetal polymer and the crystalline oxymethylene polymer, preferably below about 0.05 weight percent, and most preferably below about 0.01 weight percent.

The uniform product obtained by the blending procedure is then comminuted mechanically, for example, by chopping, pelletizing or grinding into granules, pellets, chips, flakes or powders. The blend is finally processed in the thermoplastic state, for example by injection molding or extrusion molding, into shaped articles, including bars, rods, plates, sheets, films, ribbons, tubes, and the like. Preferably, prior to molding, the comminuted blend is dried again, in the manner discussed above.

In order that those skilled in the art can more fully understand this invention, the following non-limiting examples are provided.

Example 1

A solution of 25 ml of 1,3-dioxepane, 25 ml of 1,3-dioxolane, and 0.25 ml of divinyloxybutane (obtained from Polysciences, Inc.) was dried over molecular sieves and then placed in a 4-oz. bottle containing a septum, a magnetic stirrer, and a nitrogen atmosphere. Polymerization was initiated by adding to the reactants 0.44 ml of a 1% by volume solution of trifluoromethanesulfonic acid (triflic acid) in nitromethane so that the solution of reactants had a triflic acid concentration of 0.001M. Polymerization began immediately and was complete within an hour. The product obtained was a dark green rubbery mass.

Example 2

A dry solution of 25 ml of 1,3-dioxepane, 25 ml of 1,3-dioxolane, and 2.5 ml of poly(butadiene oxide) (obtained form Polysciences, Inc.) was placed in a 4-oz. bottle with a magnetic stirring bar and a septum under a nitrogen atmosphere. The concentration of water in this solution was measured at 4 μg/ml. A 0.1% solution (by weight) of triflic acid in dry nitromethane was prepared, and 4.6 ml of this triflic acid solution was injected into the solution of reactants, resulting in a triflic acid concentration of 0.001M. No immediate reaction was apparent. The solution had polymerized after 3 days. The product was a dark yellow-brown rubbery solid.

Example 3

A dry solution of 25 ml of 1,3-dioxolane, 25 ml of 1,3-dioxepane, and 5.0 ml of poly(butadiene oxide) was placed in a 4-oz. bottle with a magnetic stirring bar and septum under a nitrogen atmosphere. The concentration of water was measured at 10 μg/ml. A 4.9 ml aliquot of 0.1% triflic acid in nitromethane solution was added, yielding a monomer solution that was 0.001M in triflic acid. No immediate reaction was observed. After 3 days, a very rubbery, crumbly, medium-yellow solid was obtained. It was not as tough as the product in Example 2.

Examples 4–6

Dry solutions of monomers were made up under nitrogen in 8-oz. bottles with magnetic stirring bars and septa in the amounts shown in Table 1. Polymerization reactions were initiated by adding enough 0.1% triflic acid in nitromethane to make the monomer solution 0.001M in triflic acid. Polymerization times were 18–24 hours (see Table 1). The reactions were not very exothermic. The highest temperature reached in any of the three experiments was 33° C. Bubbles were noted in Examples 4 and 5. All three experiments yielded brown, solid, very rubbery materials. The product in Example 5 appeared to be especially tough.

TABLE 1

|  | Example | | |
|---|---|---|---|
|  | 4 | 5 | 6 |
| 1,3-dioxolane | 100 ml | 30 ml | 20 ml |
| 1,3-dioxepane | 100 ml | 20 ml | 30 ml |
| Poly(butadiene oxide) | 10 ml | 2.5 ml | 2.5 ml |
| Polymerization time | 18 hrs | 23 hrs | 24 hrs |

Example 7

The crosslinked elastomeric acetal of Example 1 is ground to a small-particle size. Mixtures of this crosslinked material are prepared with Celcon® acetal resin, from Hoechst Celanese Corporation, so that the mixtures contain 2%, 5%, 10%, 15%, 20%, 25% and 30% of the crosslinked elastomer. The mixing is performed at room temperature in a dry atmosphere. The Celcon® acetal polymer in granulated form is first dried by heating to 75° C. overnight in a dry atmosphere. The mixture of particles of Celcon® acetal polymer and cured elastomer is then blended in an extruder at 190°–210° C. A molding resin with improved impact strength is obtained.

Example 8

The crosslinked elastomeric acetals of Examples 2–6 are ground to a small particle size and blended with Celcon® acetal polymer according to the procedure of Example 7. Molding resins with improved impact strength are obtained.

It is to be understood that the above-described embodiments of the invention are illustrative only and that modification throughout may occur to one skilled in the art. Accordingly, this invention is not to be regarded as limited to the embodiments disclosed herein but is to be limited and defined only by the appended claims.

What is claimed is:

1. A crosslinked acetal polymer consisting essentially of monomer units derived from:
   (a) 1,3-dioxolane;
   (b) 1,3-dioxepane; and
   (c) one or more polyfunctional crosslinking compounds, said crosslinking compounds having at least two reactive functional groups, each of said reactive functional groups being subject to cationic polymerization; said crosslinked elastomeric acetal polymer being non-crystalline at room temperature.

2. A crosslinked elastomeric acetal polymer, as recited in claim 1, wherein said reactive functional groups of said polyfunctional crosslinking compound are selected from the group of reactive functional groups consisting of epoxides, glycidyl ethers, glycidyl esters, cyclic ethers, vinyl ethers, vinyl esters, acrylate esters, methacrylate esters, allyl ethers, and allyl esters.

3. A crosslinked elastomeric acetal polymer, as recited in claim 1, wherein monomer units derived from 1,3-dioxolane and 1,3-dioxepane are incorporated in a volume ratio ranging from about 20:80 to about 80:20, and said polyfunctional crosslinking compound is incorporated from about 0.1% to about 10% of the sum of the volume of said 1,3-dioxolane and said 1,3-dioxepane.

4. A crosslinked elastomeric acetal polymer, as recited in claim 3, wherein monomer units derived from 1,3-dioxolane and 1,3-dioxepane are incorporated in a volume ratio ranging from about 60:40 to about 40:60, and 1,4-divinyloxybutane is incorporated as about 0.5% of the sum of the volumes of 1,3-dioxolane and 1,3-dioxepane.

5. A crosslinked elastomeric acetal polymer, as recited in claim 1, wherein said monomer units are incorporated in approximately equal amounts by volume.

6. A crosslinked elastomeric acetal polymer consisting essentially of monomer units derived from the group consisting of 1,3-dioxolane 1,3-dioxepane, and mixtures thereof; and 1,4-divinyloxybutane as the cross linking compound, said crosslinking compound being subject to cationic polymerization and said crosslinked elastomeric acetal polymer being non-crystalline at room temperature.

* * * * *